Aug. 2, 1932.  E. G. K. ANDERSON  1,869,645
SWIVEL FIXTURE
Filed Sept. 3, 1929
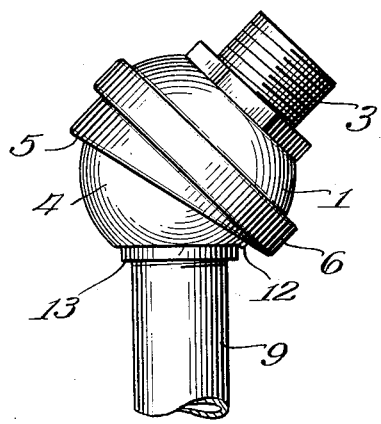
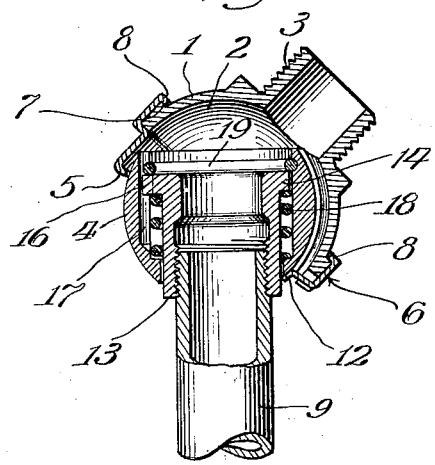
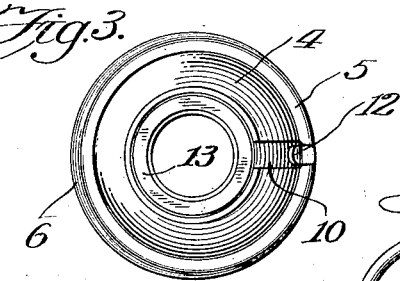
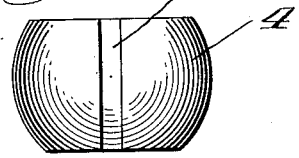
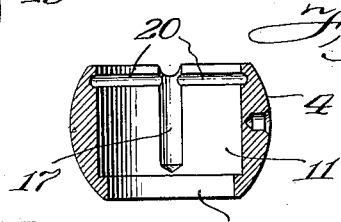
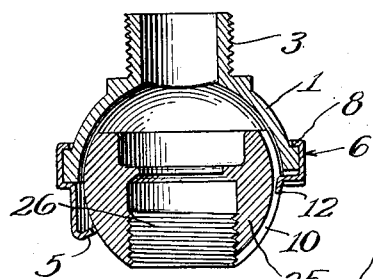
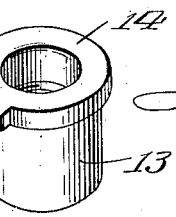
Inventor
E. G. K. Anderson
By Wm. G. Freudenreich Atty.

Patented Aug. 2, 1932

1,869,645

UNITED STATES PATENT OFFICE

ERNST G. K. ANDERSON, OF EVANSTON, ILLINOIS, ASSIGNOR TO APPLETON ELECTRIC COMPANY, A CORPORATION OF ILLINOIS

SWIVEL FIXTURE

Application filed September 3, 1929. Serial No. 390,203.

The present invention relates to fixture hangers and the like provided with a ball and socket joint, and has for its object to produce a construction that will permit a wider range of swinging movements, than heretofore, between the supporting member and the supported or suspended member.

The various features of novelty whereby my invention is characterized will hereinafter be pointed out with particularity in the claim; but, for a full understanding of my invention and of its objects and advantages, reference may be had to the following detailed description taken in connection with the accompanying drawing, wherein:

Figure 1 is a side elevation of a device constructed in accordance with the present invention; Fig. 2 is a vertical central section through the device; Fig. 3 is an end view; Figs. 4 and 5 are respectively a side view of and a central section through the ball member of the device; Fig. 6 is a perspective view of the sliding spring-supported sleeve mounted in the ball; Fig. 7 is a view of the stop ring; and Fig. 8 is a central section through a modified form of device.

Referring to the drawing, 1 represents a cup-shaped socket member having therein a hemispherical cavity or socket 2 and provided with a tubular stem 3 opening out of the bottom of the socket and adapted for connection to a pipe or conduit. Fitted within the hemispherical socket is a ball member 4. The ball member is held in place by means of a retaining ring 5, preferably made of sheet metal; the ring having an internal diameter smaller than the diameter of the ball. The retaining ring forms part of a cap 6 that fits over the open end of the socket member and is bent inwardly behind an annular shoulder 7 on the socket member, as indicated at 8. The retaining member as a whole is so shaped that the ring proper lies at an acute angle to the longitudinal central axis of the member 1, instead of at right angles thereto. Consequently, a pipe or stem 9 connected at its upper end to the ball member may be swung farther away from the longitudinal central axis of the socket member than is the case where the retaining ring lies at right angles to said axis. In other words, if a lighting fixture is to be hung from a steep rafter, the pipe or stem 9 may hang in a vertical position whereas, if the retaining ring were at right angles to the central axis of the socket this would not be possible with the socket in its natural position.

The ball member has in the periphery the usual groove 10 extending parallel with the axis of the central opening 11 extending through the ball. A lip 12 is pressed out of the retaining ring and projects into the groove so as to prevent the ball from rotating bodily about its longitudinal axis.

In the arrangement shown in Figs. 1 to 6, the pipe or stem is not connected directly to the ball but is screwed into the lower end of a sleeve 13 slidable in the opening 11 in the ball. The sleeve has at its upper end an outwardly directed annular flange 14. The flange 14 is a sliding fit in the opening or bore 11 whose lower end is reduced in diameter, as indicated at 15 to accommodate the body portion of the sleeve 13. A lug 16 projects from the flange on the sleeve into a vertical groove 17 in the ball at the side of the opening 11, thereby preventing the sleeve from turning in the ball. Surrounding the sleeve between the shoulder in the ball where the bore of smaller diameter 15 meets the bore of larger diameter 11, and the under side of the flange or head 14 on the sleeve, is a compression spring 18 which forms the actual support for the weight carried by the pipe or stem. The spring may be held under an initial compression by suitable stop means that will hold the sleeve down against the tendency of the spring to raise it. In the arrangement shown, there is a split ring 19 that is sprung into a groove 20 extending entirely around the bore or opening 11 near the top of the latter. Normally the spring holds the sleeve pressed up against the stop ring but, when the load on the pipe or stem 9 is greater than the initial compression of the spring, the spring will be further compressed, permitting the sleeve to slide down away from the stop ring.

In Fig. 8 I have shown my improved device provided with a ball 25 having a central screwthreaded opening 26 into which the pipe or stem 9 may be screwed so that the pipe or stem is supported directly from the ball. Otherwise the structure is the same as that heretofore described; corresponding elements being provided with the same reference characters as in Figs. 1 to 5.

It will thus be seen that I have produced a simple and novel swivel joint for supporting a fixture or the like, which will permit the supported member to make a more acute angle with the supporting member than has heretofore been the case in devices of this kind.

While I have illustrated and described with particularity only a single preferred form of my invention, I do not desire to be limited to the exact structural details thus illustrated and described; but intend to cover all forms and arrangements which come within the definitions of my invention constituting the appended claim.

I claim:—

In a device of the character described, a member having a hemispherical socket, a ball fitted into the socket, a cap fixed to said member and extending across the socket, said cap having a ball-retaining ring surrounding the ball and having an internal diameter less than the diameter of the ball, said ring lying at an acute angle to the central axis of the socket, said ball being hollow, a fixture stud extending into and slidable in the ball, said stud having at its inner end an external flange, a spring surrounding the stud below the flange, and there being a shoulder within the ball supporting the spring.

In testimony whereof, I sign this specification.

ERNST G. K. ANDERSON.